United States Patent [19]

Francis

[11] Patent Number: 5,445,312

[45] Date of Patent: Aug. 29, 1995

[54] HEAT ACTIVATED CLOSURE

[76] Inventor: Steven D. Francis, 3 E. Yellowstone Dr., Londonderry, N.H. 03053

[21] Appl. No.: 223,511

[22] Filed: Apr. 26, 1994

[51] Int. Cl.6 .......................... B23K 1/008; H01J 7/22
[52] U.S. Cl. ................................ 228/221; 228/124.16; 445/43
[58] Field of Search ...................... 228/124, 221, 124.6; 445/43

[56] References Cited

U.S. PATENT DOCUMENTS 2,934,392  4/1960  De Santis et al. ................ 445/43 X
3,924,792  12/1975  Vrijssen ...................... 228/124.6 X

FOREIGN PATENT DOCUMENTS 2067449  7/1981  United Kingdom ................. 445/43

Primary Examiner—Kenneth J. Ramsey
Attorney, Agent, or Firm—Davis, Bujold & Streck

[57] ABSTRACT

A desired environment is entrapped inside a hollow workpiece by placing a meltable filler adjacent a plurality of capillaries in the wall of the workpiece. The workpiece is then placed in the desired controlled environment (e.g. a vacuum). The workpiece is then heated to melt the filler material which then through capillary action flows into and closes all of the capillaries thereby entrapping the controlled environment within the workpiece.

14 Claims, 2 Drawing Sheets

HEAT ACTIVATED CLOSURE

FIELD OF THE INVENTION

This invention pertains to a heat activated closure for a hollow workpiece that is able to hermetically seal itself at a specific activation temperature and under a controlled environment, thereby entrapping the controlled environment in the workpiece, in particular to a valve for isolating a vacuum within the workpiece by brazing.

BACKGROUND OF THE INVENTION

In order to evacuate a hollow workpiece the workpiece is provided with an evacuation port or outlet. The workpiece is subsequently placed in a vacuum chamber and the vacuum chamber is evacuated simultaneously evacuating the workpiece through the evacuation port. Once the chamber, and consequently the workpiece, is evacuated to the desired extent, the evacuation port must be hermetically sealed to prevent air from leaking back into the workpiece destroying the vacuum therein.

The fact that the workpiece is sealed in an evacuated vacuum chamber makes it difficult to seal the evacuation port. The chamber cannot be opened to provide access to the workpiece until the evacuation port is sealed if the vacuum is not to be destroyed. Therefore, it is necessary to seal the vacuum port while the workpiece is still sealed in the vacuum chamber. Several valves and methods are known for sealing the vacuum port while it is still sealed inside the vacuum chamber. These valves and methods all suffer from either a high rate of failure to properly seal the port or from expensive moving parts.

One such prior art method provides for a fixture that is mounted to or positioned adjacent the workpiece inside a vacuum furnace. The fixture contains a stack of ball bearings that are suspended above the evacuation port during evacuation of the furnace and the workpiece. One of the workpiece, fixture or ball bearing are provided with brazing solder. Once the chamber is sufficiently evacuated a ball bearing is dropped into the evacuation port and the furnace is heated to a temperature sufficient to melt the brazing solder and braze the ball bearing in the evacuation port atmospherically sealing the evacuation port.

The above prior art method and apparatus may be provided with a mechanism for mechanically releasing the ball bearing so that it drops into the port or the fixture may be provided with a means for releasing the ball bearing when the fixture is heated to a specific temperature. Either way, the method suffers from a high rate of failure due to any misplacement of the ball bearing or incomplete brazing. Likewise the method requires moving parts that are expensive to manufacture and susceptible to failure, particularly in view of the high temperatures involved.

The present invention strives to overcome the problems present in prior art methods and devices by providing a method and closure system for hermetically sealing an evacuation port that contains no moving parts, is inexpensive and highly reliable.

SUMMARY OF THE INVENTION

A method and valve for atmospherically sealing a hollow workpiece according to the invention is provided in which a series or group of small holes or a fine mesh screen forms the evacuation port. The holes or the mesh are sized and spaced so that a brazing solder, appropriately located adjacent to or around the holes or mesh, will flow, when molten, by capillary action, into the holes or mesh where by surface tension it will completely seal the same and become permanent when the brazing solder subsequently solidifies.

According to the invention there is provided a closure for hermetically sealing a cavity in a workpiece comprising at least one capillary passing through a wall of the workpiece to connect the cavity with an environment exterior to the cavity and a meltable filler material placed adjacent said at least one capillary opening such that, when melted, the filler material enters said at least one capillary under capillary action to completely close, by virtue of its surface tension, said at least one capillary thereby hermetically sealing the cavity when cooled.

Also according to the invention there is provided a closure for a cavity of a workpiece comprising a body (2) having a plurality of capillaries (21) and a meltable filler material (6) disposed adjacent said plurality of capillaries such that, when melted, the filler material is drawn into said plurality of capillaries capillary action to completely close all said holes.

Also according to the invention there is provided a process for hermetically sealing a desired environment in a cavity of a workpiece comprising the steps of providing at least one capillary in a wall of said workpiece connecting the cavity with the environment outside the cavity placing a meltable filler material, such that, when melted, said filler material will flow by capillary action into the capillary thereby hermetically sealing the cavity heating the workpiece in a controlled atmosphere to melt the filler material and allowing the filler material to flow into the capillary and cooling the workpiece to solidify the filler material.

Also according to the invention there is provided a process for hermetically sealing a cavity in a workpiece while disposed in a vacuum furnace comprising the steps of providing a structure defining, at least in part, a plurality of capillaries connecting the cavity with the environment outside of the cavity placing a meltable filler material adjacent said plurality of capillaries placing said structure in an exhaust port in the cavity placing the workpiece into a vacuum furnace evacuating the vacuum furnace and heating the workpiece, while in said vacuum, to melt the filler material, such so that said filler material runs into said plurality of capillaries by capillary action to hermetically seal the cavity.

BRIEF DESCRIPTION OF THE DRAWINGS

The invention will now be described, by way of example, with reference to the accompanying drawings in which.

DETAILED DESCRIPTION OF THE INVENTION

Figure 1:
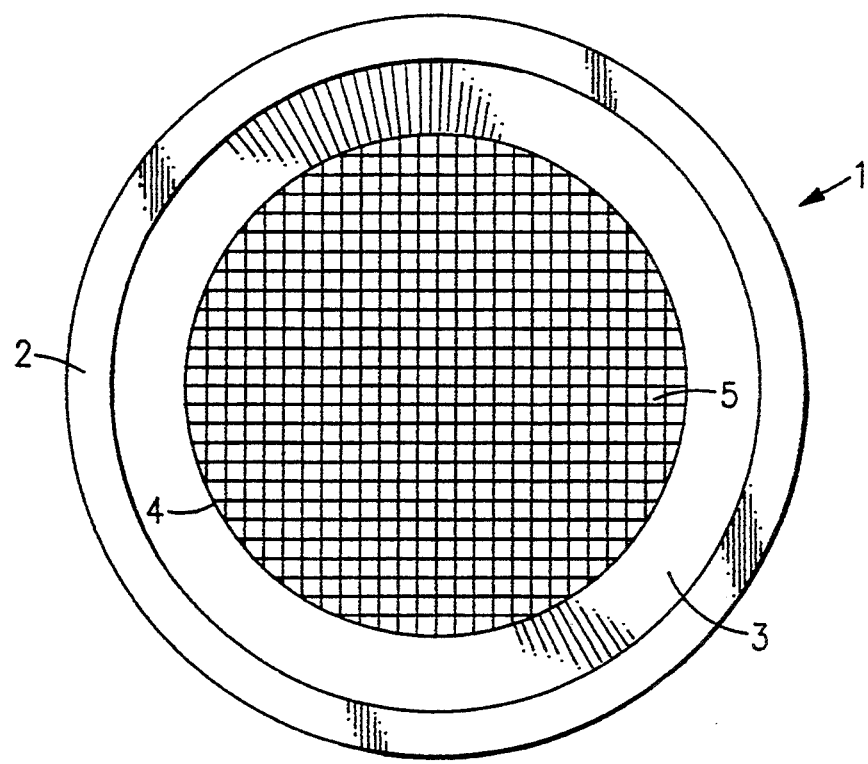
FIG. 1 is a diagrammatic plan of a closure according to a first embodiment of the invention.
Figure 2:
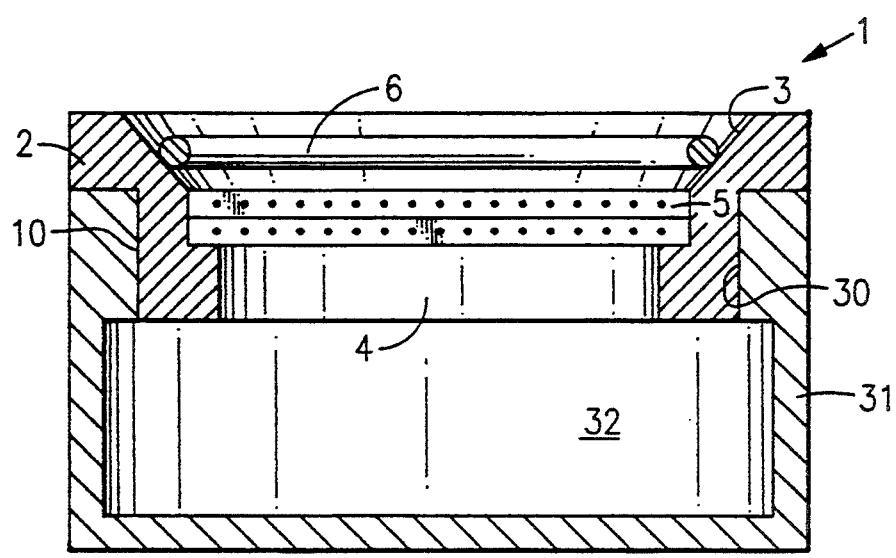
FIG. 2 is a cross sectional elevation of the closure of FIG. 1.
Figure 3:
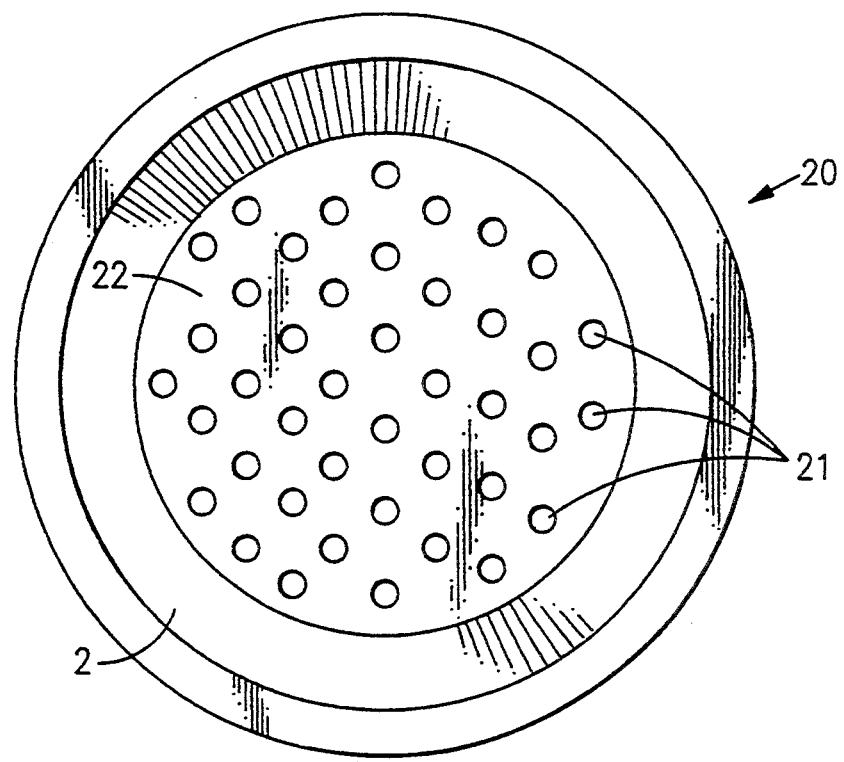
FIG. 3 is a diagrammatic plan of a closure according to a second embodiment of the invention.
Figure 4:
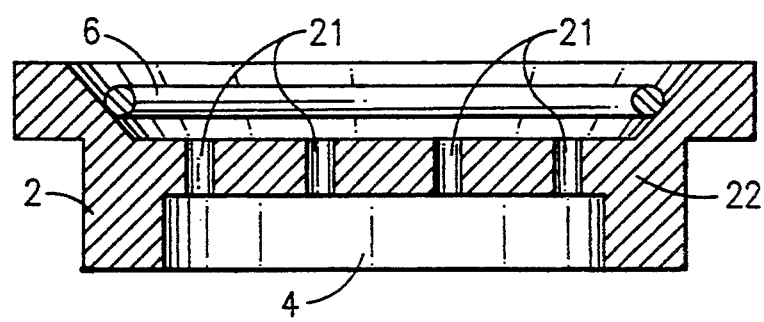
FIG. 4 is a cross-sectional elevation of the closure of FIG. 3.

A closure 1 of the first embodiment is shown in FIGS. 1 and 2 and a closure 20 of the second embodiment is shown in FIGS. 3 and 4 with similar parts being designated by the same numbers.

Closures 1 and 20 each comprise a ring shaped body 2 having an opening 4 that passes therethrough to allow air or any other fluid to flow therethrough. It will be appreciated that the body 2 may be other than a ring shape, e.g. it may be square, triangular etc.

The body has a portion of reduced external cross section 10 to facilitate the mounting of the body 2 in an opening in a hollow workpiece to be evacuated. The reduced portion 10 may have threads for mounting the body 2 in the opening of the workpiece. On the other hand, the reduced portion 10 may have a smooth cylindrical surface as shown in FIG. 2 and may be fastened in a workpiece by any suitable means, e.g. adhesive, welding, etc., or it may, for example, have an O-ring seal thereon with positive locking means for sealingly locking it in place in a workpiece. In a preferred arrangement the body is brazed to the workpiece during a brazing operation in a vacuum furnace.

In order to atmospherically seal the closure 1 of the first embodiment of the invention, a multi-layered mesh screen 5 is mounted in the opening 4 in the valve body 2. A ring of brazing solder 6 is located on the body 2 adjacent the screen 5 as shown in FIGS. 2 and 4. It will be appreciated that the brazing solder 6 may be placed adjacent the screen 5 in other arrangements, as long as it is positioned to flow into all of the openings in the screen when melted, e.g. the filler material my be located completely to one side of the screen 5.

According to the second embodiment of the invention, a portion 22 of the body 2 is substituted for screen(s) 5. This portion 22 has a plurality of small holes or openings 21 (i.e. capillaries) passing therethrough as shown in FIGS. 3 and 4. It will be appreciated that, in theory, there need be only one capillary 21 passing through the valve body 2.

The brazing solder 6 is preferably a metal or metal alloy brazing solder in solid form, e.g. wire, paste, foil etc., that will melt at a specific temperature and flow into the screen 5. Then, due to the fine size of the screen 5, the solder, which is still in liquid form, flows by virtue of capillary action into the spaces in the screen or holes 21 and completely fills the spaces in the screen or holes 21 by virtue of its surface tension thereby closing the openings or holes in the structure 20. Thus, when cooled, the evacuation port in the workpiece is sealed isolating any desired controlled atmosphere or vacuum therein. The brazing solder could, as will be appreciated, be any other suitable filler material to function in accordance with the requirements of this invention.

In order to ensure that the solder will flow into the screen 5, or the holes 21, when melted, the body may have an inclined or tapering mouth 3 upon which the solder 6 is placed. The walls of this mouth are preferably inclined at 45 degrees. In this way, if the closure 1 or 20 is positioned with the mouth 3 facing up, as shown if FIGS. 2 and 4, then the solder will flow under the force of gravity into the screen 5 or openings 21 when melted.

In operation, the closure 1 (operation of closure 20 would be similar), with the brazing solder 6 in position in solid form, is mounted in a port 30 in a hollow object or workpiece 31 defining a cavity 32 to be hermetically sealed with a vacuum or some other controlled environment therein. The workpiece incorporating the closure structure is then placed in a vacuum furnace and the furnace is evacuated. The workpiece is simultaneously evacuated via the opening 4 in the closure structure.

Next, the vacuum furnace is heated to a temperature equal to or above the melting temperature of the solder. The melted solder 6 is drawn by capillary action into the interstices of the screen thereby closing all the openings by virtue of its surface tension, thereby hermetically sealing the desired controlled atmosphere or vacuum in the cavity. After cooling, the workpiece can now be safely removed from the vacuum furnace without compromising the controlled atmosphere or vacuum entrapped in the cavity.

The closure 1 or 20 is preferably made of stainless steel. However it will be appreciated that any other suitable material may be used depending on the application. The closure 1 or 20 is preferably mounted in the part of the workpiece with brazing solder therebetween so that when the vacuum furnace is heated the closure will be brazed in place in the workpiece. Likewise, the workpiece is preferably assembled with brazing solder between adjoining parts so that the workpiece will be brazed together when the vacuum furnace is heated.

The screen is preferably a multi-layer screen. The number of layers and the mesh size of the screen varies depending on the application.

The size of the holes 21 in the plate 22 or of the interstices of the screen 5 are selected according to the viscosity and surface tension of the liquid form of the filler material to be used or vice versa. The openings must be small enough that the filler material will flow into the openings in a controlled manner under capillary action with surface tension acting to seal all of the openings. For example, the holes 21 in the plate 22 are preferably no larger than 0.762 mm (0.030 inches) in diameter. Likewise, a 1-3 layer screen may have openings (interstices) of 0.0127 to 0.254 mm (0.005 to 0.10 inches), and a 1-2 layer screen may have openings of 0.0025 to 0.005 mm (0.001 to 0.002 inches). The size of the holes 21 or the openings in the screen 5 can be varied depending on the application and on the filler material to be used.

The brazing solder is preferably chosen from those that are commercially available and have an appropriate melting point, viscosity in liquid form, and strength when in solid form for the particular application. Of course, the filler material must have a melting point that is higher than the temperature at which the workpiece is to be used. Some suitable commercially available brazing solders are:

| American Welding Society Designation | melting temperature °C. (°F.) |
| --- | --- |
| BNi-5 | 1177 (2150) |
| Pure Cu | 1093 (2000) |
| BNi-2 | 1038 (1900) |
| BAu-4 | 996 (1825) |
| BNi-6 | 954 (1750) |
| BAg-8 | 788 (1450) |

The present invention effectively seals a controlled atmosphere or vacuum in a hollow workpiece simply by heating the workpiece, with a closure therein, in the desired controlled environment, e.g vacuum, inert gas etc. The filler material reliably and quickly seals the screen or the holes through capillary action and surface tension resulting in a low reject rate and is therefore highly suited for mass production applications.

It can be appreciated that the closure can be an integral part of the workpiece rather than a separate assembly. For example, the workpiece can have an evacuation port formed by a screen or at least one capillary surrounded by an inclined mouth, all of which are provided in the workpiece itself, with filler material preplaced in solid form on the inclined mouth.

Further it will be appreciated that the capillaries may be formed by a combination of grooves formed in the periphery of the body (the opening 4 may then be omitted) and the port in the workpiece which is to be closed by the operation of the present invention. In this arrangement the brazing solder, prior to melting, may be disposed around the outside of the body adjacent the grooves.

I claim:

1. A closure for hermetically sealing a cavity in a workpiece comprising:
    at least one capillary passing through a wall of the workpiece to connect the cavity with an environment exterior to the cavity and a meltable filler material placed adjacent said at least one capillary opening such that, when melted, the filler material enters said at least one capillary under capillary action to completely close, by virtue of its surface tension, said at least one capillary thereby hermetically sealing the cavity when cooled; and
    wherein a screen defines interstices forming said at least one capillary opening.

2. A closure as in claim 1, wherein there are a plurality of said capillaries passing through the wall of the workpiece.

3. A closure as in claim 2, comprising an inclined mouth in the wall of the workpiece surrounding and inclined inwardly toward the plurality of capillaries, the filler material being located on the inclined mouth.

4. A closure according to claim 1, wherein said screen (5) comprises a plurality of layers.

5. A closure as in claim 1, comprising an inclined mouth in the wall of the workpiece surrounding and inclined inwardly toward the screen, wherein the filler material is located on the inclined mouth.

6. A closure for a cavity of a workpiece comprising:
    a body (2) having a plurality of capillaries (21) and a meltable filler material (6) disposed adjacent said plurality of capillaries such that, when melted, the filler material is drawn into said plurality of capillaries under capillary action to completely close all said capillaries; and
    wherein the plurality of capillaries are defined by interstices of a screen (5) fast in an exhaust opening defined by the body.

7. A closure according to claim 6, wherein said screen (5) comprises a plurality of layers.

8. A closure according to claim 6, wherein said exhaust opening has an inclined mouth (3) and the filler material (6) is disposed in said inclined mouth so that, when melted with the mouth facing vertically upwardly, the filler material runs, under the force of gravity, to said plurality of capillaries.

9. A closure according to claim 6, wherein said body (2) has mounting means (10) for mounting said body in a port in a hollow workpiece.

10. A closure according to claim 9 in combination with the workpiece, wherein said body is fast in said port and the capillaries are defined by the body in said port.

11. A process for hermetically sealing a desired environment in a cavity of a workpiece comprising the steps of:
    providing an exhaust port passing through a wall of said workpiece connecting the cavity with the environment outside the cavity;
    fixing a screen in said port, said screen forming a plurality of interstices that define a plurality of capillaries connecting the cavity with the environment outside the cavity;
    placing a meltable filler material, such that, when melted, said filler material will flow by capillary action into the capillaries thereby hermetically sealing the cavity;
    heating the workpiece in a controlled atmosphere to melt the filler material and allowing the filler material to flow into the capillaries; and
    cooling the workpiece to solidify the filler material.

12. A process for hermetically sealing a cavity in a workpiece while disposed in a vacuum furnace comprising the steps of:
    providing a structure containing a screen that defines a plurality of capillaries for connecting the cavity with the environment outside of the cavity;
    placing a meltable filler material adjacent said screen;
    placing said structure in an exhaust port in the cavity, thereby connecting the cavity with the environment outside of the cavity, via said capillaries;
    placing the workpiece into a vacuum furnace;
    evacuating the vacuum furnace; and
    heating the workpiece, while in said vacuum, to melt the filler material, so that said filler material runs into said plurality of capillaries by capillary action to hermetically seal the cavity.

13. A process according to claim 12 further comprising the steps of:
    selecting brazing solder as said filler material;
    placing said brazing solder adjacent the structure's placement in the exhaust port; and
    melting the brazing solder to simultaneously close the capillaries and sealingly attach the structure in the exhaust port with the melted solder.

14. A process according to claim 13 further comprising the steps of:
    assembling the workpiece out of a plurality of parts; and
    brazing all of said assembled parts together, as desired, simultaneously with the brazing of the structure into the exhaust port and closing of the capillaries.

* * * * *